(12) United States Patent
Gao et al.

(10) Patent No.: US 6,683,017 B2
(45) Date of Patent: Jan. 27, 2004

(54) CATALYST SYSTEM FOR THE (CO) POLYMERIZATION OF OLEFINS

(75) Inventors: Mingzhi Gao, Beijing (CN); Jian Zhou, Beijing (CN); Yun Zhao, Beijing (CN); Zhulan Li, Beijing (CN); Yantoo Yang, Beijing (CN); Juxiu Yang, Beijing (CN); Weihua Feng, Beijing (CN)

(73) Assignees: China Petro - Chemical Corporation, Beijing (CN); Beijing Research Institute of Chemical Industry, Beijing (CN)

( * ) Notice: Subject to any disclaimer, the term of this patent is extended or adjusted under 35 U.S.C. 154(b) by 344 days.

(21) Appl. No.: 09/732,045

(22) Filed: Dec. 6, 2000

(65) Prior Publication Data

US 2001/0025006 A1 Sep. 27, 2001

(30) Foreign Application Priority Data

Dec. 6, 1999 (CN) ........................ 99125566 A

(51) Int. Cl.$^7$ ............................ B01J 31/00; B01J 37/00; C08F 4/02; C08F 4/60
(52) U.S. Cl. ........................................ 502/126
(58) Field of Search ........................................ 502/126

(56) References Cited

U.S. PATENT DOCUMENTS

| | | | | |
|---|---|---|---|---|
| 4,784,983 A | | 11/1988 | Mao et al. ................ | 502/111 |
| 4,861,847 A | * | 8/1989 | Mao et al. ................ | 526/125.3 |
| 5,247,031 A | * | 9/1993 | Kioka et al. ............. | 526/124.8 |
| 6,111,038 A | * | 8/2000 | Kioka et al. ............. | 526/123.1 |
| 6,320,009 B1 | * | 11/2001 | Nakano et al. ........... | 526/351 |
| 6,376,417 B1 | * | 4/2002 | Yang et al. ............... | 502/121 |

FOREIGN PATENT DOCUMENTS

| | | |
|---|---|---|
| CN | 1143651 | 2/1997 |
| EP | 0 728 769 | 8/1996 |

* cited by examiner

*Primary Examiner*—Mark L. Bell
*Assistant Examiner*—Jennine Brown
(74) *Attorney, Agent, or Firm*—Christie, Parker & Hale, LLP

(57) ABSTRACT

A catalyst system for the (co)polymerization of propylene contains (A) a solid catalyst component comprising titanium, magnesium, halogen and a 1,3-diether; (B) an organic aluminum compound; and optionally (C) an organic silicon compound. In comparison with the prior art, stereospecificity of the polymer prepared by using the catalyst system of this invention evenl containing no external electron-donor is greater than 99%. Also, the activity of the catalyst system and hydrogen gas adjustability on the molecular weight of the polymer do not significantly decrease.

14 Claims, No Drawings

CATALYST SYSTEM FOR THE (CO) POLYMERIZATION OF OLEFINS

CROSS-REFERENCE TO RELATED APPLICATION

This application claims priority of China patent Application No. 99125566.6, filed on Dec. 6, 1999.

BACKGROUND OF THE INVENTION

The present invention relates to a catalyst system for the (co)polymerization of olefins.

In recent years, a study of a catalyst for olefinic polymerization has been greatly developed and properties of the catalyst have been greatly improved. Meanwhile, olefinic polymerization catalysts with better properties are desired as the demand for the processability of the polymer product become higher and higher.

U.S. Pat. No. 4,784,983 discloses a catalyst system for olefinic polymerization comprising components (A), (B) and (C). Component (A) is prepared by dissolving a halide of magnesium in a solvent mixture of an organic epoxy compound and an organic phosphorus compound to form a homogeneous solution; mixing the homogeneous solution with a liquid halide of titanium; adding an auxiliary precipitant such as organic carboxylic acid anhydrides, organic carboxylic acids, ethers and ketones to form a precipitate; adding at least one polycarboxylic acid ester when the precipitate appears; and separating the precipitate from the mixture and treating the separated precipitate with the halide of titanium or a mixture of the halide of titanium in an inert diluent. The activity of the catalyst system of the patent is a very high. The resultant polymer using the catalyst system has very high stereospecificity and a narrow particle size distribution.

One main method of adjusting molecular weight of polypropylene is to introduce hydrogen gas into the polymerization system. When the catalyst system of U.S. Pat. No. 4,784,983 is used in the propylene polymerization, sensitivity of adjusting molecular weight of polypropylene with hydrogen gas is not ideal.

CN 1143651A disclosed solid catalyst components and catalyst therefrom. The catalysts comprise the reaction product of: (1) a solid catalyst component containing an internal electron-donor; (2) an Al-alkyl compound, and optionally (3) an external electron-donor. The catalyst obtained by using, as the external-electron donor, cyclopolyenic, 1,3-diethers exhibit in the polymerization of olefins very high balances of activity and stereosepcificity. But, when the catalysts are used in file polymerization of propylene, an external electron-donor must be added in order to obtain the polymer with stereospecificity of greater 99%. If no external electron-donor is used, stereospecificity of the resultant polymer can only be about 98%. However, when an external electron-donor is added in the polymerization of olefins, the sensitivity of active sites of the catalysts to hydrogen gas decreases, hydrogen gas adjustability on the molecular weight of polypropylene becomes bad and activity of the catalysts greatly decreases.

An object of the present invention is to provide a catalyst system for the (co)polymerization of olefins that overcome the above drawbacks in the prior art.

SUMMARY OF THE INVENTION

The present invention provides a catalyst system for the (co)polymerization of olefins, characterized in that it consists of the following components:

(A) A solid catalyst component comprising titanium, magnesium, halogen and a 1,3-diether and prepared by dissolving a halide of magnesium in a solvent system consisting of an organic epoxy compound, an organic phosphorus compound and optionally an inert diluent to form a homogeneous solution; mixing the homogeneous solution with titanium tetrahalide or its derivatives to form a mixture; precipitating a solid from the mixture in the presence of at least one auxiliary precipitant; treating the solid with the 1,3-diether to load the diether on the solid; and treating the diether loaded solid with the titanium tetrahalide or its derivatives and the inert diluent;

(B) An organic aluminum compound; and optionally
(C) An organic silicon compound.

DETAILED DESCRIPTION OF THE INVENTION

The present invention is described in details as follows.
1. The halide of Magnesium solution The halide of Magnesium solution herein means a uniform solution obtained by dissolving a halide of magnesium in a solvent system consisting essentially of organic epoxy compounds and organic phosphorus compounds. The solvent system may include inert diluents.

(1) Halide of magnesium

Suitable halide of magnesium includes magnesium halide such as magnesium chloride, magnesium bromide and magnesium iodide; a complex of magnesium halide with water or alcohol; a derivative of magnesium halide wherein a halogen atom is substituted by a hydrocarboxyl or halohydrocarboxyl group; and like.

(2) Organic epoxy compound

Suitable organic epoxy compound includes oxides of aliphatic olefins, aliphatic diolefins, halogenated aliphatic olefins, and halogenated aliphatic diolefins, glycidyl ethers, cyclic ethers and the like having 2–8 carbon atoms. Examples of suitable organic epoxy compounds are ethylene oxide, propylene oxide, butylene oxide, butadiene dioxide, epoxy chloropropane, methylglycidyl ether, diglycidyl ether, tetrahydrofuran, and the like.

(3) Organic phosphorus compounds

Suitable organic phosphorus compounds include hydrocarbon and halohydrocarbon esters of phosphoric acid or phosphorous acid, e.g. trimethyl phosphate, triethyl phosphate, tributyl phosphate, triphenyl phosphate, trimethyl phosphate, triethyl phosphate, tributyl phosphate, triphenyl phosphite and the like.

(4) Preparation of the halide of magnesium solution

The particle size of the halide of magnesium used is preferred to be such that it is easily dissolved with stirring. The dissolution temperature is about 0° C.–100° C., preferably from 30° C.–70° C. Inert diluents such as hexane, heptane, octane, benzene, toluene, xylene, 1,2-dichloroethane, chlorobenzene and other hydrocarbons or halohydrocarbons can be added into the solvent system. The amount of epoxy compounds added is about 0.2–10.0 moles, preferably 0.5–4.0 moles, per mole of halide of magnesium, and the amount of organic phosphorus compounds added is about 0.1–3.0 moles, preferably 0.3–1.0 moles, per mole of halide of magnesium.
2. Precipitation of the solid The halide of magnesium solution is maixed liquid titanium tetrahalide to form a solid precipitate in the presence of an auxiliary precipitant. 1,3-diether may be added before or after the precipitation of the solid and loaded on the solid.

According to the invention, the auxiliary precipitant can be added either after the halide of magnesium solution is obtained or together with the halide of magnesium. The liquid titanium tetrahalide or its derivatives can be in the pure liquid state, or in a solution of inert diluents.

(1) Titanium tetrahalide or its derivatives

The halide of titanium used in the preparation of the solid catalyst component (A) of the invention is a compound having the formula $TiX_n(OR)_{4-n}$ wherein X is a halogen, each R is independently a hydrocarbyl and n is an integer of from 0 to 4. Examples of the compounds are titanium tetrachloride, titanium tetrabromide, titanium tetraiodide, tetrabutoxy titanium, tetraethoxy titanium, chlorotriethoxy titanium, dichlorodiethoxy titanium, trichloroethoxy titanium and the like.

The halide of magnesium solution and liquid titanium tetrahalide or its derivatives used in the present invention have been disclosed in U.S. Pat. No. 4,784,983 which is incorporated herein by reference.

(2) 1,3-diether

The 1,3-diether used in this invention is selected from the compounds of the general formula:

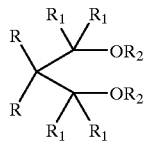

Where each R is independently hydrogen, halogen, linear or branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl, with the proviso that all R cannot be hydrogen or $CH_3$;

Each $R_1$ is independently hydrogen, halogen, linear or branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl;

Each $R_2$ is independently hydrogen, halogen, linear or branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl;

Two R can be bonded to each other to form saturated or unsaturated condensed cyclic structures, optionally substituted with a radical selected from the group consisting of halogen, linear or branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl.

The 1,3-dietheris is used as internal electron-donor in the catalyst system of this invention.

Particularly preferred among 1,3-diether are the compounds of the formula:

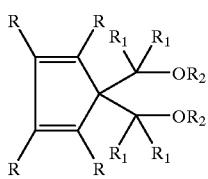

More preferred among the 1,3-diether are the compounds of the formula:

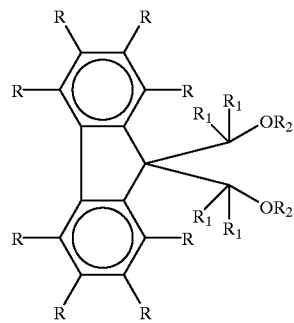

In the above formulas, each R is independently hydrogen, halogen, linear or branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl;

Each $R_1$ is independently hydrogen, halogen, linear or branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl;

Each $R_2$ is independently hydrogen, halogen, linear or branched $C_7$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl;

Two or more of R can be bonded to each other to form saturated or unsaturated condensed cyclic structures, optionally substituted with a radical selected from the group consisting of halogen, linear or branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl.

Specific examples of 1,3-diether are:
2-(2-ethyl hexyl)-1,3-dimethoxypropane;
2-isopropyl-1,3-dimethoxypropane;
2-butyl-1,3-dimethoxypropane;
2-sec-bytyl-1,3-dimethoxypropane;
2-cyclohexyl-1,3-dimethoxypropane;
2-phenyl-1,3-dimethoxypropane;
2-cumyl-1,3-dimethoxypropane;
2-(2-phenyl ethyl)-1,3-dimethoxypropane;
2-(2-cyclohexyl ethyl)-1,3-dimethoxypropane;
2-(para-chloro phenyl)-1,3-dimethoxypropane;
2-(diphenyl methyl)-1,3-dimethoxypropane;
2-(1naphthyl)-1,3-dimethoxypropane;
2-(2-fluorophenyl)-1,3-dimethoxypropane;
2-(1-decahydronaphthalenyl)-1,3-dimethoxypropane;
2-(para-tert-butyl phenyl)-1,3-dimethoxypropane;
2,2-dicyclohexyl-1,3-dimethoxypropane;
2,2-dicyclopentyl-1,3-dimethoxypropane;
2,2-diethyl-1,3-dimethoxypropane;
2,2-dipropyl-1,3-dimethoxypropane,
2,2-diisopropyl-1,3-dimethoxypropane;
2,2-dibutyl-1,3-dimethoxypropane,
2-methyl-2-propyl-1,3-dimethoxypropane;
2-methyl-2-benzyl-1,3-dimethoxypropane;
2-methyl-2-ethyl-1,3-dimethoxypropane;
2-methyl-2-isopropyl-1,3-dimethoxypropane;
2-methyl-2-phenyl-1,3-dimethoxypropane;
2methyl-2-cyclohexyl-1,3-dimethoxypropane;
2,2-bis(p-chlorophenyl)-1,3-dimethoxypropane;
2,2-bis(2-cyclohexylethyl)-1,3-dimethoxypropane;
2-methyl-2-isobutyl-1,3-dimethoxypropane;
2-methyl-2-(2-ethylhexyl)-1,3-dimethoxypropane;
2,2-diisobutyl-1,3-dimethoxypropane;
2,2-diphenyl-1,3-dimethoxypropane;
2,2-dibenzyl-1,3-dimethoxypropane;
2,2-bis(cyclohexylmethyl)-1,3-dimethoxypropane;
2-isobutyl-2-isopropyl-1,3-dimethoxypropane;
2-(1-methyl butyl)-2-isopropyl-1,3-dimethoxypropane;

2-(1-methylbutyl-1)-2-sec-butyl-1,3-dimethoxypropane;
2,2-di-sec-butyl-1,3-dimethoxypropane.
2,2-di-tert-butyl-1,3-dimethoxypropane;
2,-2-di-neopentyl-1,3-dimethoxypropane;
2-isopropyl-2-isopentyl-1,3-dimethoxypropane;
2-phenyl-2-isopropyl-1,3-dimethoxypropane;
2-phenyl-2-sec-butyl-1,3-dimethoxypropane;
2-benzyl-2-isopropyl-1,3-dimethoxypropane;
2-benzyl-2-sec-butyl-1,3-dimethoxypropane;
2-phenyl-2-benzyl-1,3-dimethoxypropane;
2-cyclopentyl-2-isopropyl-1,3-dimethoxypropane;
2-cyclopentyl-2-sec-butyl-1,3-dimethoxypropane;
2-cyclohexyl-2-isopropyl-1,3-dimethoxypropane;
2-cyclohexyl-2-sec-butyl-1,3-dimethoxypropane;
2-cyclohexyl-2-sec-butyl-1,3-dimethoxypropane;
2-cyclohexyl-2-cyclohexyl methyl-1,3-dimethoxypropane;
1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)-indene;
1,1-bis(methoxymethyl)-2,3-dimethylindene,
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phentyindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethylsilylindene,
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopentylindene;
1,1-bis(methoxymethyl)-7-isopropylindene,
1,1-bis(methoxymethyl)-7-cyclohexylindene;
1,1-bis(methoxymethyl)-7-tertbutylindene;
1,1-bis(methoxymethyl)-7-tert-butyl-2-methylindene;
1,1-bis(methoxymethyl)-7-phenylinden;
1,1-bis(methoxymethyl)-2-phenylinden;
9,9-bis(methoxymethyl)-fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene,
9,9-bis(methoxymethyl)-2,7-diisopropylfluorene;
9,9-bis(methoxymethyl)-1,8-dichlorofluorene;
9,9-bis(methoxymethyl)-2,7-diisopropylfluorene
9,9-bis(methoxymethyl)-2,7-dicyclopentylfluorene;
9,9-bis(methoxymethyl)-1,8-dichlorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tertbutylfluorene;
1,1-bis(1'-butoxyethyl)-cyclopentadiene;
1,2-bis(1'-isopropoxy-n-propyl)cyclopentadiene;
1-methoxymethyl-1-(1'-methoxyethyl)-2,3,4,5-tetramethylcyclopentadiene;
1,1-bis(α-metoxybenzyl)indene;
1,1-bis(phenoxymethyl)indene,
1,1-bis(1'-methoxyethyl)-5,6-dichloroindene;
1,1-bis(phenoxymethyl)-3,6-dicyclohexylindene;
1-methoxymethyl-1-(1'-methoxyentyl)-7-tert-butylindene;
1,1-bis[2-(2'-methoxypropyl)]-2-methylindene;
9,9-bis(α-methoxybenzyl)fluorene;
9,9-bis(1'-isopropoxynbutyl-4,5-diphenylfluorene;
9,9-bis(1'-methoxyethyl)fluorene;
9-(methoxymethyl)-9-(1'-methoxyethyl)-2,3,6,7-tetrafluoroflurorene;
9-methoxymethyl-9-pentoxymethylfluorene;
9-methoxymethyl-9-ethoxymethylfluorene;
9-methoxymethyl-9-(1'-methoxyethyl)-fluorene;
9-methoxymethyl-9-[2-(2'-methoxypropyl)]-fluorene;
1,1-bis(methoxymethyl)-2,5-cyclohexadiene;
1,1-bis(methoxymethyl)benzonaphthene;
7,7-bis(methoxymethyl)-2,5-norbornadiene;
9,9-bis(methoxymethyl)-1,4-methanedihydronaphthalene;
9,9-bis(methoxymethyl)-9,10-dihydroanthracene;
1,1-bis(methoxymethyl)-1,2-dihydronaphthalene;
4,4-bis(methoxymethyl)-1-phenyl-3,4-dihydronaphthalene;
4,4-bis(methoxymethyl)-1-phenyl-1,4-dihydronaphthalene;
5,5-bis(methoxymethyl)-1,3,6-cycloheptatriene.

(3) Auxiliary precipitant

The auxiliary precipitant according to this invention includes organic acid anhydrides, organic acids, ketones, aldehydes, ethers and any combination thereof, such as acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, diamyl ether, 1,3-diether and the like.

The step of treating the solid may be omitted when the auxiliary precipitant comprises the 1,3-diether.

(4) Precipitation of the solid

The process of solids precipitation can be carried out by one of two methods. One method involves mixing liquid titanium tetralalide with a halide of magnesium at a temperature in the range of about −40° C. to 0° C., and precipitating the solids while the temperature is raised slowly. The other method involves adding liquid titanium tetrahalide dropwise into the homogeneous halide of magnesium solution at room temperature to precipitate out solids immediately, In both methods, an auxiliary precipitant must be present in the reaction system. The auxiliary precipitant can be added before or after precipitation of the solid.

In order to obtain uniform solid particles, the process of precipitation should be carried out slowly. When the second method of adding titanium halide dropwise at room temperature is applied, the process should preferably take place over a period of from about 1 hour to 6 hours. When the first method of raising the temperature in a slow manner is applied, the rate of temperature increase preferably ranges from about 4° C. to about 100° C. per hour.

The mole ratios of various components per mole of magnesium halide in this step are as follow: titanium halide, 0.5–150, preferably 1–20 and auxiliary precipitant, 0.03–1.0, preferably 0.05–1.4.

3. Treatment and washing of the solid precipitate

The solid precipitate is first separated from the mixture. In the solid precipitate thus obtained is entrained a variety of complexes and impurities, so that further treatment is necessary.

The solid precipitate are treated with titanium tetrahalide or a mixture of titanium tetrahalide and an inert diluent and then washed with an inert diluent. The amount of titanium tetrahalide used is 1 to 20 moles, preferably 2 to 15 moles, per mole of halide of magnesium. The treatment temperature ranges from 50° C. to 150° C., preferably from 60° C. to 100° C. If a mixture of titanium tetrahalide and inert diluent is used to treat the solid precipitate, the volume % of titanium tetrahalide in the treating solution is 10–100 percent, preferably 20–80 percent, the rest being an inert diluent.

The treated solids are further washed with an inert diluent to remove ineffective titanium compounds and other impurities.

Component (A) according to the present invention thus obtained through the above described steps 1, 2 and 3, can be used as a solid or as a suspension.

4. Polymerization of α-olefin

The catalyst system according to this invention consists of components (A), (B) and optionally (C).

(1) Organic aluminum compound

Component (B) is an organic aluminum compound having the formula $AlR_{n'}X_{3-n'}$ wherein each R is independently hydrogen, or a hydrocarbon group having 1–20 carbon atoms, preferably an alkyl, aralkyl or aryl group; X is a halogen, preferably chlorine or bromine; and n' is a number of from 1 to 3. Examples of the compounds are trialkyl aluminums such as trimethyl aluminum, triethyl aluminum, tri-isobutyl aluminum and trioctyl aluminum; hydrogenated alkyl aluminums such as diethyl aluminum hydride and di-isobutyl aluminum hydride; halogenated alkyl aluminums such as diethyl aluminum chloride, di-isobutyl aluminum chloride, sesquitectyl aluminum sesquichloride and ethyl aluminum dichloride; with triethyl aluminum and tri-isobutyl aluminum being preferred.

(2) Organic silicon compound

Component (C) is an organic silicon compound having the formula $R_{n'}Si(OR')_{4-n'}$ wherein n' is an integer of from 0 to 3; R and R' each is independently is alkyl, cycloalkyl, aryl, or haloalkyl group. Examples of such compounds are trimethlyl methoxysilane, trimethyl ethoxysilane, methyl cyclohexyl dimethoxy silane, dibutyl dimethoxy silane, dimethyl dimethoxysilane, dimethyl diethoxysilane, diphenyl dimethoxysilane, diphenyl diethoxysilane, phenyl triethoxysilane, pheyl trimethoxysilane, and the like. Component (C) may be replaced with 1,3-diether.

In the catalyst system of the invention, the molar ratio of aluminium in component (B) to titanium in component (A) is from 5 to 1000, preferably from 100 to 800, and the molar ratio of silicon in component (C) to titanium in component (A) is from 2 to 100, preferably from 8 to 32.

Components (B) and (C) have been disclosed in U.S. Pat. No. 4,784,983 which is incorporated herein by reference.

(3) α-olefins

It is suitable to employ the catalyst system of this invention in the polymerization of α-olefins, e.g. ethylene, propylene, 1-butylene, 4-methyl-1-pentene, 1-hexylene, 1-octylene and the like. Homopolymerization as well as atactic copolymerixation and block copolymerization of these olefins can be carried out using the catalyst system of the resent invention. Conjugated diene or nonconjugated diene can be selected as a monomer in copolymerizaiton.

Liquid-phase polymerization and gas-phase polymerization can both be employed. An inert solvent selected from saturated aliphatic or aromatic hydrocarbons such as hexane, heptane, cyclohexane, naphtha, extract oil, hydrogenated gasoline, kerosene, benzene, toluene and xylene can be used as the reaction medium in liquid-phase polymerization. The olefin itself can also act as the reaction medium. Prepolymerization can be conducted before polymerization. Polymerization can be carried out in batch mode, semi-continuous or continuous mode.

The polymerization takes place at a temperature ranging from room temperature to about 150° C., preferably from about 50° C. to 100° C. Hydrogen gas can be used as a molecular weight regulator.

In comparison with the prior art, the catalyst system of the present invention when used in the polymerization of propylene has significant advantages as follows:

1. The activity of the catalyst system of this invention, due to incorporation of the 1,3-diether, is greatly improved.
2. When the catalyst system of this invention is used in the propylene polymerization, sensitivity of adjusting the molecular weight of polypropylene with hydrogen gas is excellent.
3. Stereospecificity of the polymer obtained by using the catalyst system of this invention is from 92% to 99.9%.
4. When the catalysts of CN 1143651A are used in the polymerization of propylene, an external electron-donor must be added in order to obtain the polymer with stereospeificity of greater than 99%. If no external electron-donor is used, stereospecificity of the resultant polymer can be only about 98%. However, when an external electron-donor is added in the polymerization of olefins, the sensitivity of active sites of the catalysts to hydrogen gas decreases, hydrogen gas adjustability on the molecular weight of polypropylene becomes bad and activity of the catalysts greatly decreases.

Stereospecificity of the polymer prepared by using the catalyst system of this invention even containing no external electron-donor is greater than 99%. Also, the activity of the catalyst system and hydrogen gas adjustability on the molecular weight of the polymer do not significantly decrease.

In order that the invention may be more fully understood, the following Examples and Comparative Examples are given by way of illustration only.

EXAMPLE 1

Preparation of solid catalyst component (A):

Anhydrous magnesium chloride (4.8 g), toluene (95 ml), epoxy chloropropane(EPC) (4.0 ml) and tributyl phosphate (TBP) (12.5 ml) were introduced into a reactor which has thoroughly been purged with highly purified nitrogen. The temperature was raised to 50° C. with stirring, and the mixture was then maintained at that temperature for 2.5 hours, while the solids were dissolved completely. Phthalic anhydride (1.4 g) was added to the solution, and then the solution was maintained for an additional 1 hour at 50° C. The solution was cooled to −25° C. Then titanium tetrachloride (56 ml) was added dropwise over a course of 1 hour. The solution was slowly heated to 80° C., while a solid product is precipitated. 9,9-bis(methoxymethyl)fluorene (2.0 g) was added and the mixture was maintained at the temperature of 80° C. for 1 hour. The solid portion was collected by filtration and washed at 110° C. with toluene (2×100 ml). A brown-yellow solid precipitate was obtained. The solid was then treated with toluene (60 ml) and titanium tetrachloride (40 ml) for 2 hours at 90° C. After the filtrate was removed, the treatment step is repeated. The solid was washed with toluene (3×100 ml), and then with hexane (4×100 ml) to obtain 6.0 g of a solid which contained 2.65% by weight of titanium, 16.70% by weight of magnesium, 52.53% by weight of chlorine and 18.01% by weight of 9,9-bis(methoxymethyl)fluorene.

EXAMPLE 2

Triethyl aluminum (0.0025 mol) and solid catalyst component (A) (5 mg) prepared in Example 1 introduced into a 5-liter stainless steel autoclave which has been thoroughly purged with propylene. After introducing 2.3 L propylene and 1000 ml hydrogen, the temperature was raised to 70° C. Propylene was polymerized for 1 hours. The amount of the resulting polymer was 352 g. Melt index, stereospecificity and bulk density of the polymer are 2.5 g/10 min, 97.2% and 0.46 g/ml, respectively.

EXAMPLE 3

Example 2 was followed except that the amount of hydrogen was changed to 3000 ml. Melt index of the resulting polymer is 25.4 g/10 Min.

EXAMPLE 4

Example 2 was followed except that the amount of hydrogen was changed to 5000 ml. Melt index of the resulting polymer is 100 g/10 Min.

EXAMPLE 5

Anhydrous magnesium chloride (4.8 g), toluene (95 ml), epoxy chloropropane(EPC) (4.0 ml) and tributyl phosphate (TBP) (12.5 ml) were introduced into a reactor which has thoroughly been purged with highly purified nitrogen. The temperature was raised to 50° C. with stirring, and the mixture was then maintained at that temperature for 2.5 hours, while the solids were dissolved completely. Phthalic anhydride (0.7 g) and 9,9-bis(methoxymethyl)fluorene (2.0 g) was added to the solution, and then the solution was maintained for an additional 1 hour at 50° C. The solution was cooled to −25° C. Then titanium tetrachloride (56 ml) was added dropwise over a course of 1 hour. The solution was slowly heated to 80° C., while a solid product is precipitated. 9,9-bis(methoxymethyl)fluorene (0.2 g) was added and the mixture was maintained at the temperature of 80° C. for 1 hour. The solid portion was collected by filtration and washed at 110° C. with toluene (2×100 ml). A brown-yellow solid precipitate was obtained. The solid was then treated with toluene (60 ml) and titanium tetrachloride (40 ml) for 0.5 hours at 110° C. After the filtrate was removed, the treatment step is repeated three times. The solid was washed with toluene (3×100 ml), and then with hexane (4×100 ml) to obtain 5.8 g of a solid which contained 2.05% by weight of titanium, 17.81% by weight of magnesium, 55.08% by weight of chlorine and 20.28% by weight of 9,9-bis(methoxymethyl)fluorene.

EXAMPLE 6

Example 2 was followed except that solid catalyst component (A) (5 mg) prepared in Example 5 was used. Melt index and stereospecificity of the resulting polymer are 2.6 g/10 Min and 99.0%, respectively.

EXAMPLE 7

Example 6 was followed except that the amount of hydrogen was changed to 3000 ml. Melt index of the resultant polymer is 23.4 g/10 Min.

EXAMPLE 8

Example 6 was followed except that the amount of hydrogen was changed to 5000 ml. Melt index of the resultant polymer is 125 g/10 Min.

COMPARATIVE EXAMPLE 1

Example 1 was followed except that 9,9-bis (methoxymethyl) fluorene (2.0 g) was changed to diisobutyl phthalate (1.6 ml) to obtain 5.6 g of a solid which contained 2.72% by weight of titanium, 17.81% by weight of magnesium, 54.53% by weight of chlorine and 10.23% by weight of diisobutyl phthalate.

COMPARATIVE EXAMPLES 2

Triethyl aluminum (0.0025 mol), methyl cyclohexyl dimethoxysilane (0.0001 mol) and solid catalyst component (A) (5 mg) prepared in comparative example 1 were introduced into a 5-liter stainless steel autoclave which has been thoroughly purged with propylene. After introducing 2.5 L propylene and 500 mol hydrogen, the temperature was raised to 70° C. Propylene was polymerized for 1 hours. The amount of the resulting polymer was 182 g. Melt index and stereospecificity of the polymer are 2.1 g/10 Min and 99.0%, respectively.

COMPARATIVE EXAMPLE 3

Comparative example 2 was followed except that the amount of hydrogen was changed to 400 ml. Melt index of the resulting polymer is 19.3 g/10 Min.

COMPARATIVE EXAMPLE 4

Comparative example 2 was followed except that the amount of hydrogen was changed to 600 ml. Melt index of the resulting polymer is 32.7 g/10 Min.

EXAMPLE 9

Example 1 was followed except that the amount of 9,9-bis(methoxy methyl) fluorene was changed to 0.8 g and the treatment temperature was changed to 110° C. from 90° C. The solid (5.4 g) was obtained. The solid contained 2.15% by weight of titanium and 13.17% by weight of 9,9-bis(methoxymethyl)fluorene.

EXAMPLE 10

Example 2 was followed except that the solid catalyst component (5 mg) prepared in Examples 9 was used to obtain 162 g of the polymer. The melt index and stereospecificity of the polymer were 3.6 g/10 min and 91.5%, respectively.

EXAMPLE 11

Comparative example 2 was followed except that solid catalyst component (A) (5 mg) prepared in example 9 was used to obtain 150 g of the resulting polymer. The melt index and stereospecificity of the polymer were 2.2 g/10 min and 95.8%, respectively.

EXAMPLE 12

Example 1 was followed except that the amount of 9,9-bis(methoxy methyl)fluorene was changed to 4.5 g to obtain 5.4 g of a solid which contained 3.41% by weight of titanium, 15.23% by weight of magnesium, 50.22% by weight of chlorine and 29.15% by weight of 9, 9-bis (methoxymethyl)fluorene.

EXAMPLE 13

Example 2 was followed except that solid catalyst component (A) (5 mg) prepared in Example 12 was used to obtain 102 g of the resulting polymer. Melt and stereospecificity of the polymer were 2.6 g/10 min and 98.9%, respectively.

EXAMPLE 14

Anhydrous magnesium chloride (4.8 g), toluene (95 ml), epoxy chloropropane(EPC) (4.0 ml) and tributyl phosphate (TBP) (12.5 ml) were introduced into a reactor which has thoroughly been purged with highly purified nitrogen. The temperature was raised to 50° C. with stirring, and the mixture was then maintained at that temperature for 2.5 hours, while the solids were dissolved completely. 9,9-bis (methoxymethyl)fluorene (1.4 g) was added to the solution, and then the solution was maintained for an additional 1 hour at 50° C. The solution was cooled to −25° C. Then titanium tetrachloride (56 ml) was added dropwise over a course of 1 hour. The solution was slowly heated to 80° C., while a solid product is precipitated. 9, 9-bis (methoxymethyl)fluorene (0.5 g) was added and the mixture was maintained at the temperature of 80° C. for 1 hour. The solid portion was collected by filtration and washed at 110° C. with toluene (2×100 ml). A brown-yellow solid precipitate was obtained. The solid was then treated with toluene (60 ml) and titanium tetrachloride (40 ml) for 0.5 hours at 110° C. After the filtrate was removed, the treatment step is repeated three times. The solid was washed with toluene (3×100 ml), and then with hexane (4×100 ml) to obtain 5.8 g of a solid which contained 2.35% by weight of titanium, 16.89% by weight of magnesium, 53.38% by weight of chlorine and 17.94% by weight of 9,9-bis(methoxymethyl) fluorene.

EXAMPLE 15

Example 2 was followed except that solid catalyst component (A) (5 mg) prepared in Example 14 was used to obtain 605 g of the resulting polymer. Melt index and stereospecificity of the polymer were 2.9 g/10 min and 97.2%, respectively.

EXAMPLE 16

Example 15 was followed except that the amount of hydrogen was changed to 3000 ml. Melt index of the resulting polymer is 31.0 g/10 Min.

EXAMPLE 17

Comparative Example 2 was followed except that solid catalyst component (A) (5 mg) prepared in Example 14 was used to obtain 510 g of the resulting polymer. Melt index and stereospecificity of the polymer were 2.2 g/10 min and 98.8%, respectively.

EXAMPLE 18

Example 17 was followed except that the amount of hydrogen was changed to 3000 ml. Melt index of the resulting polymer is 23.8 g/10 Min.

EXAMPLE 19

Anhydrous magnesium chloride (4.8 g), toluene (95 ml), epoxy chloropropane(EPC) (4.0 ml) and tributyl phosphate (TBP) (12.5 ml) were introduced into a reactor which has thoroughly been purged with highly purified nitrogen. The temperature was raised to 50° C. with stirring, and the mixture was then maintained at that temperature for 2.5 hours, while the solids were dissolved completely. 9,9-bis (methoxymethyl)fluorene (2.0 g) was added to the solution, and then the solution was maintained for an additional 1 hour at 50° C. The solution was cooled to 25° C. Then titanium tetrachloride (56 ml) was added dropwise over a course of 1 hour. The solution was slowly heated to 80° C., while a solid product is precipitated. The mixture was maintained at the temperature of 80° C. for 1 hour. The solid portion was collected by filtration and washed at 110° C. with toluene (2×100 ml). A brown-yellow solid precipitate was obtained. The solid was then treated with toluene (60 ml) and titanium tetrachloride (40 ml) for 0.5 hours at 110° C. After the filtrate was removed, the treatment step is repeated three times The solid was washed with toluene (3×100 ml), and then with hexane (4×100 ml) to obtain 5.8 g of a solid which contained 2.30% by weight of titanium and 19.24% by weight of 9,9-bis(methoxymethyl)fluorene

EXAMPLE 20

Example 2 was followed except that solid catalyst component (A) (5 mg) prepared in Example 19 was used to obtain 600 g of the resulting polymer. Melt index and stereospecificity of the polymer were 29 g/10 min and 97.6%, respectively.

EXAMPLE 21

Anhydrous magnesium chloride (4.8 g), toluene (95 ml), epoxy chloropropane(EPC) (4.0 ml) and tributyl phosphate (TBP) (12.5 ml) were introduced into a reactor which has thoroughly been purged with highly purified nitrogen. The temperature was raised to 50° C. with stirring, and the mixture was then maintained at that temperature for 2.5 hours, while the solids were dissolved completely. Phthalic anhydride (1.4 g) was added to the solution, and then the solution was maintained for an additional 1 hour at 50° C. The solution was cooled to −25° C. Then titanium tetrachloride (56 ml) was added dropwise over a course of 1 hour. The solution was slowly heated to 80° C., while a solid product is precipitated. The mixture was maintained at the temperature of 80° C. for 1 hour. The solid portion was collected by filtration and washed at 110° C. with toluene (2×100 ml). A brown-yellow solid precipitate was obtained. The solid was then treated with toluene (60 ml) and titanium tetrachloride (40 ml) and 9,9-bis(methoxymethyl)fluorene (3.0 g) for 2 hours at 110° C. After the filtrate was removed, the treatment step is repeated with toluene (60 ml) and titanium tetrachloride (40 ml). The solid was washed with toluene (3×110 ml), and then with hexane (4×100 ml) to obtain 6.7 g of a solid which contained 2.61% by weight of titanium, 16.25% by weight of magnesium, 52.36% by weight of chlorine and 20.83% by weight of 9,9-bis (methoxymethyl)fluorene.

EXAMPLE 22

Example 2 was followed except that solid catalyst component (A) (5 mg) prepared in Example 21 was used to obtain 212 g of the resulting polymer. Melt index, stereospecificity and bulk density of the resulting polymer are 2.7 g/10 Min, 99.2% and 0.45 g/ml, respectively.

EXAMPLE 23

Example 1 was followed except that the amount of 9,9-bis(methoxy methyl) fluorene (2.0 g) was changed to 2-isopropyl-2-isopentyl-1, 3-dimethoxypropane (1.7 g) and the treatment temperature was changed to 110° C. from 90° C. The solid (5.7 g) was obtained. The solid contained 2.31% by weight of titanium and 16.01% by weight of 2-isopropyl-2-isopentyl-1, 3-dimethoxypropane.

EXAMPLE 24

Example 2 was followed except that solid catalyst component (A) (5 mg) prepared in Example 23 was used to obtain 297 g of the resulting polymer. Melt index, stereospecificity and bulk density of the resulting polymer are 2.7 g/10 Min, 98.2% and 0.45 g/ml, respectively.

EXAMPLE 25

Anhydrous magnesium chloride (4.8 g), toluene (95 ml), epoxy chloropropane(EPC) (4.0 ml) and tributyl phosphate (TBP) (12.5 ml) were introduced into a reactor which has thoroughly been purged with highly purified nitrogen. The temperature was raised to 50° C. with stirring, and the mixture was then maintained at that temperature for 2.5 hours, while the solids were dissolved completely. Phthalic anhydride (0.7 g) and 2-isopropyl-2-isopentyl-1,3-dimethoxypropane(1.7 g) was added to the solution, and then the solution was maintained for an additional 1 hour at 50° C. The solution was cooled to −25° C. Then titanium tetrachloride (56 ml) was added dropwise over a course of 1 hour. The solution was slowly heated to 80° C., while a solid product is precipitated. 2-isopropyl-2-isopentyl-1,3-dimethoxypropane(0.2 g) was added and the mixture was maintained at the temperature of 80° C. for 1 hour. The solid portion was collected by filtration and washed at 110° C. with toluene (2×100 ml). A brown-yellow solid precipitate was obtained. The solid was then treated with toluene (60 ml) and titanium tetrachloride (40 ml) for 2 hours at 110° C. After the filtrate was removed, the treatment step is repeated three times. The solid was washed with toluene (3×100 ml), and then with hexane (4×100 ml) to obtain 5.9 g of a solid which contained 2.52% by weight of titanium and 17.2% by weight of 2-isopropyl-2-isopentyl 1,3-dimethoxypropane.

EXAMPLE 26

Example 2 was followed except that solid catalyst component (A) (5 mg) prepared in Example 25 was used and the polymerization time was changed to 1 hour to obtain 440 g of the resulting polymer. Melt index, stereospecificity and bulk density of the resulting polymer are 2.8 g/10 Min, 99.2% and 0.46 g/ml, respectively.

COMPARATIVE EXAMPLE 5

Example 1 of CN1143651A was followed to obtain a solid catalyst component which contained 3.6% by weight of titanium and 16.9% by weight of 9,9-bis(methoxymethyl) fluorene.

COMPARATIVE EXAMPLE 6

Example 2 was followed except that solid catalyst component (A) (5 mg) prepared in Comparative Example 5 was used to obtain 390 g of the resulting polymer. Melt index and stereospecificity of the resulting polymer are 2.8g/10 Min and 97.9%, respectively.

COMPARATIVE EXAMPLE 7

Comparative Example 6 was followed except that the amount of hydrogen was changed to 4000 ml. Melt index of the resulting polymer is 32.9 g/10 Min.

COMPARATIVE EXAMPLE 8

Comparative Example 2 was followed except that solid catalyst component (A) (5 mg) prepared in Comparative Example 5 was used and the amount of hydrogen was changed to 4000 ml. Melt index of the resulting polymer are 26.1 g/10 Min.

What is claimed is:

1. A catalyst system for the (co)polymerization of olefins comprising:

(A) a solid catalyst component comprising titanium, magnesium, a halogen and a 1,3-diether and prepared by dissolving a halide of magnesium in a solvent system comprising an organic epoxy compound, an organic phosphorus compound and optionally an inert diluent to form a homogeneous solution; mixing the homogeneous solution with titanium tetrahalide or a derivative thereof to form a mixture; precipitating a solid from the mixture in the presence of at least one auxiliary precipitant; treating the solid with the 1,3-diether to load the diether on the solid, wherein the step of treating the solid may be omitted when the auxiliary precipitant comprises the 1,3-diether; and treating the diether loaded solid with titanium tetrahalide or its derivatives and the inert diluent;

(B) an organic aluminum compound; and optionally (C) an organic silicon compound.

2. The catalyst system according to claim 1, wherein the auxiliary precipitant is selected from organic anhydrides, organic acids, ethers, aldehydes and ketones.

3. The catalyst system according to claim 1, wherein the auxiliary precipitant is selected from acetic anhydride, phthalic anhydride, succinic anhydride, maleic anhydride, pyromellitic dianhydride, acetic acid, propionic acid, butyic acid, acrylic acid, methacrylic acid, acetone, methyl ethyl ketone, benzophenone, dimethyl ether, diethyl ether, dipropyl ether, dibutyl ether, diamyl ether, 1,3-diether and mixtures thereof.

4. The catalyst system according to claim 1, wherein the 1,3-diether is selected from compounds of the general formula:

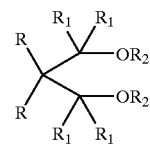

where each R is independently selected from hydrogen, halogen, linear and branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl, with the proviso that all R substituents cannot be hydrogen or $CH_3$;

each $R_1$ is independently selected from hydrogen, halogen, linear and branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl;

each $R_2$ is independently selected from linear and branched $C_1$–$C_{20}$ alkyl, $C_3$–$C_{20}$ cycloalkyl, $C_6$–$C_{20}$ aryl, $C_7$–$C_{20}$ alkaryl and $C_7$–$C20$ aralkyl;

or two R groups can be bonded to each other to form a saturated or unsaturated condensed cyclic structure, optionally substituted with a radical selected from the group consisting of halogen, linear and branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl; and the amount of the 1,3-diether is from 0.04 to 1 moles per mole of the halide of magnesium.

5. The catalyst system according to claim 1, wherein the 1,3-diether is selected from compounds of the general formula:

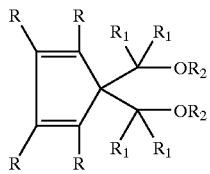

where each R is independently selected from hydrogen, halogen, linear and branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl;

each $R^1$ is independently selected from hydrogen, halogen, linear and branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl;

each $R^2$ is independently selected from linear and branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl;

or two or more of the R groups can be bonded to each other to form a saturated or unsaturated condensed cyclic structure, optionally substituted with a radical selected from the group consisting of halogen, linear and branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl.

6. The catalyst system according to claim 1, wherein the 1,3-diether is selected from compounds of the general formula:

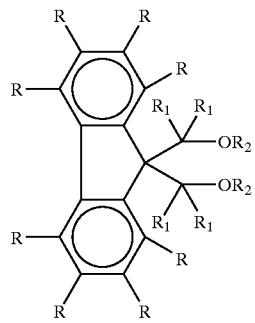

where each R is independently selected from hydrogen, halogen, linear and branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl;

each $R_1$ is independently selected from hydrogen, halogen, linear and branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl;

each $R_2$ is independently selected from linear and branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl;

or two more of the R groups can be bonded to each other to form saturated or unsaturated condensed cyclic structures, optionally substituted with a radical selected from the group consisting of halogen, linear and branched $C_1$–$C_{20}$ alkyl, $C_3$–$C_{20}$ cycloalkyl, $C_6$–$C_{20}$ aryl, $C_7$–$C_{20}$ alkaryl and $C_7$–$C_{20}$ aralkyl.

7. The catalyst system according to claim 1, wherein the 1,3-diether is selected from the group consisting of:

2-(2-ethyl hexyl)-1,3-dimethoxypropane;
2-isopropyl-1,3-dimethoxypropane;
2-butyl-1,3-dimethoxypropane;
2-sec-butyl-1,3-dimethoxypropane;
2-cyclohexyl-1,3-dimethoxypropane;
2-phenyl-1,3-dimethoxypropane;
2-cumyl-1,3-dimethoxypropane;
2-(2-phenyl ethyl)-1,3-dimethoxypropane;
2-(2-cyclohexyl ethyl)-1,3-dimethoxypropane;
2-(para-chloro phenyl)-1,3-dimethoxypropane;
2-(diphenyl methyl)-1,3-dimethoxypropane;
2-(1-naphthyl)-1,3-dimethoxypropane;
2-(2-fluorophenyl)-1,3-dimethoxypropane;
2-(1-decahydronaphthalenyl)-1,3-dimethoxypropane;
2-(para-tert-butyl phenyl)-1,3-dimethoxypropane;
2,2-dicyclohexyl-1,3-dimethoxypropane;
2,2-dicyclopentyl-1,3-dimethoxypropane;
2,2-diethyl-1,3-dimethoxypropane;
2,2-dipropyl-1,3-dimethoxypropane;
2,2-diisopropyl-1,3-dimethoxypropane;
2,2-dibutyl-1,3-dimethoxypropane;
2-methyl-2-propyl-1,3-dimethoxypropane;
2-methyl-2-benzyl-1,3-dimethoxypropane;
2-methyl-2-ethyl-1,3-dimethoxypropane;
2-methyl-2-isopropyl-1,3-dimethoxypropane;
2-methyl-2-phenyl-1,3-dimethoxypropane;
2-methyl-2-cyclohexyl-1,3-dimethoxypropane;
2,2-bis(p-chlorophenyl)-1,3-dimethoxypropane;
2,2-bis(2-cyclohexylethyl)-1,3-dimethoxypropane;
2-methyl-2-isobutyl-1,3-dimethoxypropane;
2-methyl-2-(2-ethylhexyl)-1,3-dimethoxypropane;
2,2-diisobutyl-1,3-dimethoxypropane;
2,2-diphenyl-1,3-dimethoxypropane;
2,2-dibenzyl-1,3,dimethoxypropane;
2,2-bis(cyclohexylmethyl)-1,3-dimethoxypropane;
2-isobutyl-2-isopropyl-1,3-dimethoxypropane;
2-(1-methyl butyl)-2-isopropyl-1,3-dimethoxypropane;
2-(1-methylbutyl)-2-sec-butyl-1,3-dimethoxypropane;
2,2-di-sec-butyl-1,3-dimethoxypropane;
2,2-di-tert-butyl-1,3-dimethoxypropane;
2,2-di-neopentyl-1,3-dimethoxypropane;
2-isopropyl-2-isopetyl-1,3-dimethoxypropane;
2-phenyl-2-isopropyl-1,3-dimethoxypropane;
2-phenyl-2-sec-butyl-1,3-dimethoxypropane;
2-benzyl-2-isopropyl-1,3-dimethoxypropane;
2-benzyl-2-sec-butyl-1,3-dimethoxypropane;
2-phenyl-2-benzyl-1,3-dimethoxypropane;
2-cyclopentyl-2-isopropyl-1,3-dimethoxypropane;
2-cyclopentyl-2-sec-butyl-1,3-dimethoxypropane;
2-cyclohexyl-2-isopropyl-1,3-dimethoxypropane;
2-cyclohexyl-2-sec-butyl-1,3-dimethoxypropane;
2-cyclohexyl-2-cyclohexyl methyl-1,3-dimethoxypropane;
1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;

1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)-indene;
1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylendene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethylsilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopentylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylinden;
1,1-bis(methoxymethyl)-2-phenylinden;
9,9-bis(methoxymethyl)-fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-diisopropylfluorene
9,9-bis(methoxymethyl)-2,7-dicyclopentylfluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene;
1,1-bis(1'-butoxyethyl)-cyclopentadiene;
1,2-bis(1'-isopropoxy-n-propyl)cyclopentadiene;
1-methoxymethyl-1-(1'-methoxyethyl)-2,3,4,5-tetramethylcyclopentadiene;
1,1-bis(α-methoxybenzyl)indene;
1,1-bis(phenoxymethyl)indene;
1,1-bis(1'-methoxyethyl)-5,6-dichloroindene;
1,1-bis(phenoxymethyl)-3,6-dicyclohexylindene;
1-methoxymethyl-1(1'-methoxyethyl)-7-tert-butylindene;
1,1-bis[2-(2'-methoxypropyl)]-2-methylindene;
9,9-bis(α-methoxybenzyl)fluorene;
9,9-bis(1'-isopropoxy-n-butyl-4,5-diphenylfluorene;
9,9-bis(1'-methoxyethyl)fluorene;
9-(methoxymethyl)-9-(1'-methoxyethyl)-2,3,6,7-tetrafluoroflurorene;
9-methoxymethyl-9-pentoxymethylfluorene;
9-methoxymethyl-9-ethoxymethylfluorene;
9-methoxymethyl-9-(1'-methoxyethyl)-fluorene;
9-methoxymethyl-9-[2-(2'-methoxypropyl)]-fluorene;
1,1-bis(methoxymethyl)-2,5-cyclohexadiene;
1,1-bis(methoxymethyl)benzonaphthene;
7,7-bis(methoxymethyl)-2,5-norbornadiene;
9,9-bis(methoxymethyl)-1,4-methanedihydronaphthalene;
9,9-bis(methoxymethyl)-9,10-dihydroanthracene;
1,1-bis(methoxymethyl)-1,2-dihydronaphthalene;
4,4-bis(methoxymethyl)-1-phenyl-3,4-dihydronaphthalene;
4,4-bis(methoxymethyl)-1-phenyl-1,4-dihydronaphthalene; and
5,5-bis(methoxymethyl)-1,3,6-cycloheptatriene.

8. The catalyst system according to claim 1, wherein component (B) is an organic aluminum compound having the formula $AlR_nX_{3-n}$ wherein each R is independently hydrogen or a hydrocarbyl group having 1–20 carbon atoms, X is a halogen, and n is a number ranging from 1 to 3.

9. The catalyst system according to claim 1, wherein component (B) is a trialkyl aluminum compound.

10. the catalyst system according to claim 9, wherein component (B) is selected from triethyl aluminum and tri-isobutyl aluminum.

11. The catalyst system according to claim 1, wherein component (C) is an organic silicon compound having the formula $R_nSi(OR')_{4-n}$ wherein R and R' are each independently selected from alkyl, cycloalkyl, aryl and haloalkyl and n is an integer ranging from 0 to 3.

12. The catalyst system according to claim 11, wherein component (C) is selected from trimethyl methoxysilane, trimethyl ethoxysilane, methyl cyclohexyl dimethoxysilane, dibutyl dimethoxysilane, dimethyl dimethoxysilane, dimethyl diethoxysilane, diphenyl dimethoxysilane, diphenyl diethoxysilane, phenyl triethoxysilane, phenyl trimethoxysilane, and mixtures thereof.

13. The catalyst system according to claim 1, wherein component (C) is replaced with 1,3-diether.

14. The catalyst system according to claim 9, wherein component B is selected from trimethyl aluminum, triethyl aluminum, tri-isobutyl aluminum and trioctyl aluminum; hydrogenated alkyl aluminums such as diethyl aluminum hydride and di-isobutyl aluminum hydride; halogentated alkyl aluminums such as diethyl aluminum chloride, di-isobutyl aluminum chloride, sesquiethyl aluminum sesquichloride, ethyl aluminum dichloride and mixtures thereof.

* * * * *

UNITED STATES PATENT AND TRADEMARK OFFICE
CERTIFICATE OF CORRECTION

PATENT NO. : 6,683,017 B2
DATED : January 27, 2004
INVENTOR(S) : George E. Lamming It is certified that error appears in the above-identified patent and that said Letters Patent is hereby corrected as shown below:

Column 9,
Line 10, after "analogue" delete "early".

Column 10,
Lines 20-21, delete "wherein the prostaglandin or prostaglandin analogue is to be delivered early post partum".
Line 37, after "prostaglandin or prostaglandin" insert -- analogue -- therefor.

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,683,017 B2
DATED : January 27, 2004
INVENTOR(S) : Gao et al.

It is certified that error appears in the above-identified patent and that said Letters Patent is hereby corrected as shown below:

Title page,
Item [75], Inventors, delete "Yantoo Yang", insert -- Yantao Yang --.
Item [73], Assignee, after "Beijing Research Institute of Chemical Industry", insert -- , Sinopec --.
Item [57], ABSTRACT,
Line 7, delete "evenl", insert -- eventually --.

Column 14,
Line 59, delete "$C_7$-C20 aralkyl;", insert -- $C_7$-$C_{20}$ aralkyl; --.

Column 15,
Line 17, delete "each $R^1$", insert -- each $R_1$ --.
Line 21, delete "each $R^2$" insert -- each $R_2$ --.

Column 18,
Line 1, delete "9,9-bis(l'isopropoxy-n-butyl-4,5-diphenylfluorene;", insert -- 9,9-bis(l'isopropoxy-n-butyl)-4,5-diphenylfluorene; --.
Line 28, delete "the catalyst", insert -- The catalyst --.
Line 46, delete "component B", insert -- component (B) --.

Signed and Sealed this

Eighteenth Day of October, 2005

JON W. DUDAS
*Director of the United States Patent and Trademark Office*